United States Patent
Cousineau et al.

(10) Patent No.: US 6,951,606 B2
(45) Date of Patent: *__Oct. 4, 2005__

(54) AUXILIARY FILTRATION SYSTEM FOR AN ENGINE

(75) Inventors: Jason M. Cousineau, Escanaba, MI (US); David J. Allen, Escanaba Township, MI (US)

(73) Assignee: EMP Advanced Development LLC, Escanaba, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/796,338

(22) Filed: Mar. 9, 2004

(65) Prior Publication Data

US 2004/0168959 A1 Sep. 2, 2004

Related U.S. Application Data

(63) Continuation of application No. 10/131,009, filed on Apr. 24, 2002, now Pat. No. 6,736,965.
(60) Provisional application No. 60/286,767, filed on Apr. 26, 2001.

(51) Int. Cl.⁷ ............................. B01D 33/00; F01M 1/00
(52) U.S. Cl. ........................ 210/104; 210/748; 210/97; 210/143; 210/168; 210/184; 210/198.1; 210/387; 204/665; 184/6.24; 123/196 A
(58) Field of Search .................... 210/748, 97, 103, 210/104, 143, 168, 198.1, 184, 359, 387, 400; 204/665; 184/6.24; 123/196 A (56) References Cited

U.S. PATENT DOCUMENTS

| | | |
|---|---|---|
| 794,631 A | 7/1905 | Milne |
| 2,250,672 A | 7/1941 | Keefer |
| 2,675,129 A | 4/1954 | Doubleday |
| 2,867,324 A | 1/1959 | Hirs |
| 3,368,333 A | 2/1968 | Merklin |
| 4,054,521 A | 10/1977 | Winzen |
| 4,132,485 A | 1/1979 | Hess |
| 4,221,576 A | 9/1980 | Phillips, Jr. |
| 4,260,917 A | 4/1981 | Lundin et al. |
| 4,265,748 A | 5/1981 | Villani et al. |
| 4,390,428 A | 6/1983 | Bratten |
| 4,512,299 A * | 4/1985 | Egan et al. .................. 210/168 |
| 4,620,917 A * | 11/1986 | Nozawa et al. ............. 204/665 |
| 5,307,551 A | 5/1994 | Bratten |
| 5,624,579 A | 4/1997 | Bratten |
| 5,683,581 A | 11/1997 | Schimion et al. |
| 5,968,354 A | 10/1999 | Brinkley |
| 6,095,343 A | 8/2000 | Dooley, Jr. et al. |
| 6,117,339 A | 9/2000 | Croket |
| 6,168,646 B1 | 1/2001 | Craig et al. |
| 6,174,446 B1 | 1/2001 | Andresen et al. |
| 6,736,965 B2 * | 5/2004 | Cousineau et al. ......... 210/168 |

FOREIGN PATENT DOCUMENTS

| | | |
|---|---|---|
| EP | 0 744 286 A2 | 5/1997 |
| EP | 1 061 251 A2 | 12/2000 |
| JP | 63 054960 A | 3/1988 |
| JP | 8 000930 A | 1/1996 |

* cited by examiner

Primary Examiner—David A. Reifsnyder
(74) Attorney, Agent, or Firm—Brooks Kushman P.C.

(57) ABSTRACT

An auxiliary oil filtration system and method for filtering oil in an engine is provided. The auxiliary oil filtration system consists of an auxiliary filtration device, an integral oil transfer pump controlled by an electric motor and that is in electrical communication with an electrical control unit, an electronic pressure sensor, fluid conductors, and means for connecting hardware. The auxiliary filtration device is separate from the primary engine lubrication system, and includes a media supply reel having a roll of filtering media thereon which is moveable to a take-up reel. A media indexing system advances the media supply reel as the filtering media becomes plugged. An electronic pressure sensor dictates the advancement of the filtering media when a pre-determined differential pressure across the filtering media is attained. When all of the filtering media has been transferred from the supply reel to the take-up reel, the cartridge is replaced.

26 Claims, 7 Drawing Sheets

AUXILIARY FILTRATION SYSTEM FOR AN ENGINE

CROSS-REFERENCE TO RELATED APPLICATIONS

This application is a continuation of U.S. application Ser. No. 10/131,009 filed Apr. 24, 2002, now U.S. Pat. No. 6,736,965, which, in turn, claims the benefit of U.S. provisional application Ser. No. 60/286,767 filed Apr. 26, 2001.

BACKGROUND OF THE INVENTION

1. Field of the Invention

The present invention relates to an auxiliary filtration system and a method of continuous filtration in engine applications.

2. Background Art

Current oil filtration systems for vehicle engines consist of a full flow filter in which 100% of the engine oil flow passes through the filter. The filter is designed to remove only the large particles from the oil because the filter must not restrict the oil flow. In turn, the filtering effectiveness is extremely limited. Current full flow filters are only efficient in controlling particles fifteen microns and larger. Ninety-five percent of the contamination generated within a vehicle engine is smaller then ten microns. This current filtration technology leads to short oil change intervals. Frequent oil changes are expensive, time consuming, and generate a tremendous amount of waste from the disposal of oil and oil filters. Most full flow filters are also equipped with a bypass valve. These filters have a tendency to clog before the service interval is up. When this happens, the bypass valve opens and unfiltered oil is circulated throughout the engine.

To add to the dilemma, increasingly stringent air emission regulations have dictated new engine designs employing the use of exhaust gas re-circulation (EGR) technology. EGR systems send a portion of the engine exhaust gas back to the combustion chamber in order to reduce $NO_x$ formation; however, EGR causes an increase in the amount of soot being deposited to the oil. Soot is a by-product of the combustion process and its primary component is carbon. These soot particles are very small; they are hard, abrasive and have a tendency to bind or stick together to form larger masses of soot. High soot levels in the engine oil will cause an increase in the oil viscosity, which then leads to higher operating temperatures. High soot levels will also result in the early depletion of the chemical additives in the oil which prevent oil deterioration. This leads to excessive engine wear and reduction in engine life. Finally, the large masses of soot can cause premature filter plugging. EGR provides a multi-pass opportunity for soot to enter the oil. Because of the new engine designs, especially the trend to use EGR in diesel engines, the oil is getting dirtier faster.

The industry's solution thus far has been the adaptation of bypass filter systems. The bypass filter system is typically installed in parallel to the full flow filter. The bypass filter continuously diverts a side stream of ten to fifteen percent of the engine oil flow, filters it more efficiently through the use of finer filtration, and then returns the oil back to the oil pan. The bypass filter works in conjunction with the full flow filter to capture particles and contamination that are missed by the full flow filter. When the full flow filters are run in parallel with the bypass filters, they have less work to do, thereby increasing the time between service intervals. However, the bypass filters do have limitations. Current bypass filters can capture particles in the range of five to twenty microns. This leaves many smaller and more abrasive particles suspended in the oil. One particularly harmful contaminant that remains unfiltered is soot. Soot particles are typically less than one micron in size and have a tendency to stick together or agglomerate over time. Soot agglomerates grow in size until they fall out of suspension and form sludge in the bottom of the oil pan. Because of the limited filtering capacity associated with the canister designs of current bypass filters, sludge causes premature clogging of both the full flow and bypass filters. With more soot being deposited in the oil due to EGR, this becomes an even greater concern. One final problem associated with bypass filter systems is the introduction of lube pressure parasitic losses. Because bypass systems divert approximately ten percent of an engine's total oil stream to the bypass filter, a lube pressure parasitic loss is introduced. In extreme conditions, diversion of this amount of oil can lead to starvation of necessary lubrication in certain engine components.

The use of a high efficiency bypass filtration system is not a complete answer to the problems that plague the industry. In order to extend oil and filter life, it is necessary to adopt a system that incorporates the advantages of a by-pass system with the ability to extend oil filtering capacity.

SUMMARY OF THE INVENTION

The present invention utilizes an auxiliary filtration system in conjunction with a continuous filtering method. The auxiliary filtration system operates totally independent of the main lubrication system of an engine and consists of a pump, a filtration device, and the appropriate hardware and fluid conductors. These components are installed as a separate sub-system of a vehicle engine's conventional lubrication system. The pump pumps the oil out of the oil pan, through the filtration device, and back to the oil pan in a continuous fashion. The pump flow is variable and relatively low to allow for the efficient removal of small particles. The auxiliary filtration unit is relatively easy to retrofit on existing engine systems and allows for extra oil capacity as well as off-line filtration. Oil cooling may also be incorporated into the system. The auxiliary filtration system can be used in the oil drain and fill process via the use of the pump, such as an electric oil pump, working in concert with the appropriate fluid conductors and valves or quick connect fluid conductors. During the oil drain, the oil will be pumped from the oil pan to an appropriate container. During the oil fill, the oil will be pumped from a container to the oil pan and can be sent through the filtration device to pre-filter the oil. The filtration system described herein may also be designed to be used as a replacement for the conventional full flow filter system.

The present invention utilizes an auxiliary filtration device to provide a continuous filtering method to the engine oil. This device consists of a replaceable/recyclable filtering media cartridge, a self-indexing system to continuously advance in clean filtering media, and a housing to enclose it all. The media cartridge contains filtering media, a supply reel and a take-up reel. It is also possible to design the auxiliary filtration system so that it does not contain a media cartridge. In this alternative embodiment, the filter media would be attached directly to the media reels in the filtration device housing.

The present invention applies a continuous filtering method to the engine oil. By using a reel-to-reel configuration, the filtration device is able to automatically replace used or dirty filtering media with clean filtering media in a controlled and continuous fashion. The invention provides an unlimited filtering capacity for contaminant retention over a set service interval. Because of this continuous method, the filtering operation will be unaffected by the high soot levels introduced from EGR. The reel-to-reel principle is based upon the monitoring of the pressure differential between the upstream side and the downstream side of the filtering media. When a high pressure differential exists, due to the build up of particles on the filtering media, signals will be sent to the pumping means to cease oil flow to the filter, and to the self-indexing system to advance clean filtering media from a supply reel. At the same time, the self-indexing system will eject the dirty filtering media to a take-up reel. The pumping means then initiates oil flow back through the filter device. This process is continued until a desired pressure differential is attained. When the desired service interval has been reached, the filtering media cartridge can be removed and replaced with a new cartridge.

The present invention utilizes high efficiency finer filtration to capture more soot and suspended particles than both the conventional full-flow and bypass filters. Additionally, since the auxiliary filter is filtering solid contaminants at a much finer level than the full flow filter, the full flow filter does not become prematurely clogged and its life is extended.

Electrostatic agglomeration can be incorporated into the invention to enhance the invention's ability to capture small, problematic contaminants such as soot. This could be accomplished by either placing an electrically charged wire mesh in front of the filtering media or fabricating it into the filtering media. The charged mesh would allow for the attraction and agglomeration of soot particles onto the mesh. Once the agglomerates reach a certain size, the oil flow will cause the agglomerates to break off and be collected by the filtering media. A second alternative method of soot collection utilizes a special chemical coating to enhance the filtering media and its ability to attract and collect soot particles.

The filtration device can also be designed to replenish the oil with additives. One means of accomplishing additive replenishment would be to monitor the quality of the oil, and when it is determined that replenishment is necessary, use an injector to spray additives onto the filtering media or apply a special additive chemical coating to the filtering media. In both cases, the additives would dissolve into the oil flow as it passes through the filter media. Another alternative method of additive replenishment would involve mounting a replaceable and recyclable additive releasing cartridge onto the return line. The additives would dissolve into the oil flow as it passes through the cartridge.

An alternative embodiment of the invention would be an auxiliary filtration system described herein that does not include a pump. Instead of using an auxiliary pump to pump the oil to and from the oil pan through the auxiliary filtration system, it would be possible to simply divert a side stream of oil from the standard engine lubrication system to the auxiliary filter. The auxiliary filter would be mounted in parallel with the full flow filter.

Accordingly, an object of the invention is to provide an improved engine oil filtration system which includes an auxiliary filter operatively connected to an engine oil pan for selectively filtering fine contaminants from the oil, wherein the auxiliary filter preferably consists of a replaceable/recyclable filtering media cartridge including a self-indexing system to continuously advance clean filtering medium as the filtering media becomes clogged.

The above object and other objects, features and advantages of the invention are readily apparent from the following detailed description of the best mode for carrying out the invention when taken in connection with the accompanying drawings.

DETAILED DESCRIPTION OF THE PREFERRED EMBODIMENT(S)

Figure 1:
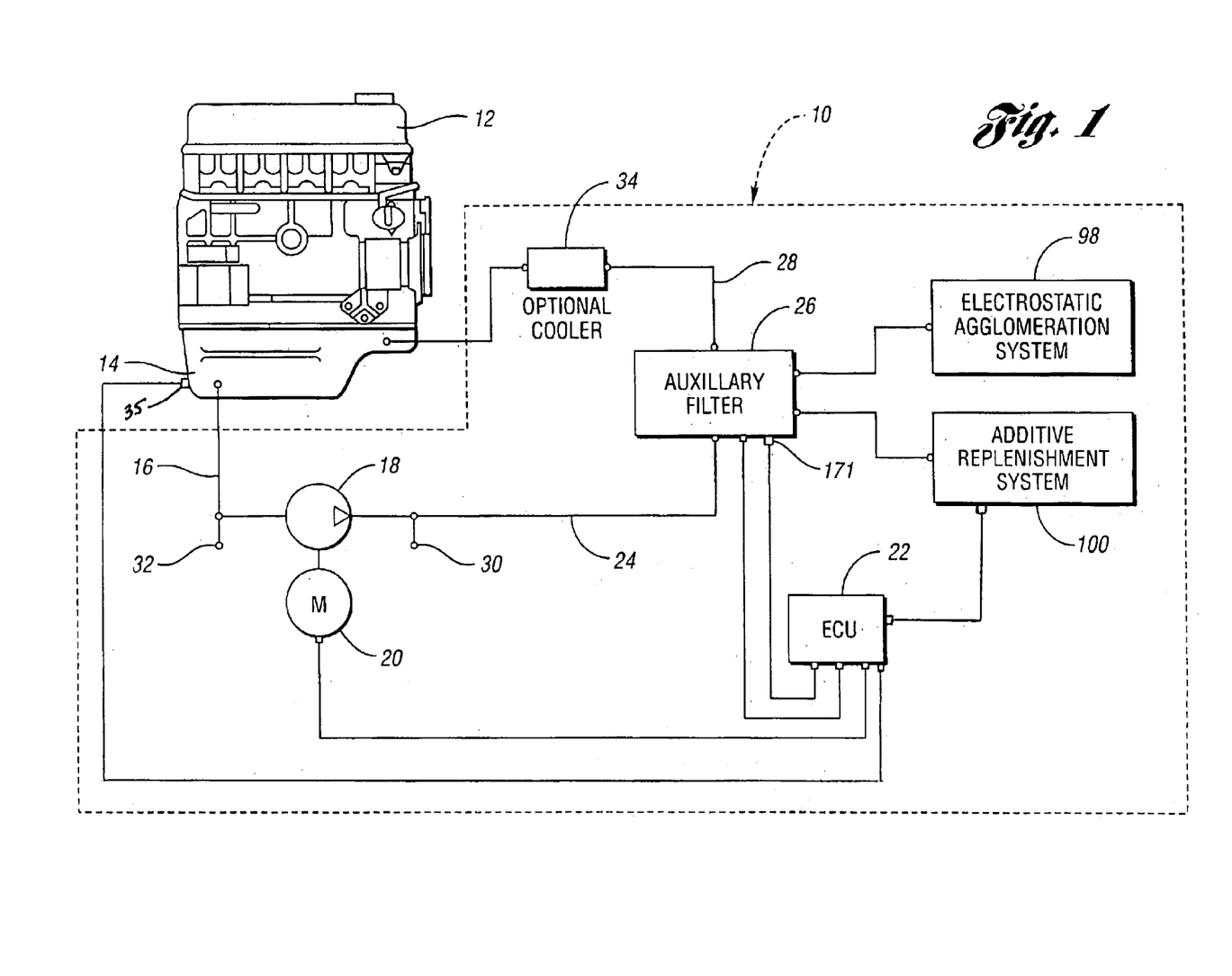
FIG. 1 shows a diagrammatic arrangement of the auxiliary filtration system circuit and its adaptation to an engine.

FIG. 1 references the overall auxiliary filtration system 10 and how all the components are installed as a subsystem to an engine application. Shown is an engine 12, having an oil pan 14. A fluid conductor 16 attached to the engine oil pan 14 runs to the inlet of an auxiliary oil pump 18. The pump 18 is mounted close to the engine oil pan 14 for performance purposes. The pump 18 is driven by an electric motor 20, and includes an internal and external gerotor set (not visible) to pump the oil. As an alternative to the gerotor sets, a spur gear set can be used. The motor 20 is controlled by a processor, which in this embodiment is an electronic control module 22. Another fluid conductor 24 is attached from the pump outlet and extends to the inlet of the auxiliary filtration device 26. Finally, a fluid conductor 28 is attached to the outlet of the auxiliary filtration device 26 to return the filtered oil back to the engine oil pan 14.

Provided in the system 10 are means for remote draining 30 and filling 32. This can be accomplished by using directional control valves at location 30 and 32. Another option would be to incorporate quick connect couplings to the fluid conductors. This would allow for the interchanging of fluid conductors for the draining and filling process. For example, for the remote draining process, fluid conductor 24 could be removed and placed at location 30. An optional cooler 34 can be installed for cooling of the oil. An oil quality/level sensor 35 can be used to signal the electronic control module 22 when the engine oil needs replenishment. Integration of an oil make-up tank and additive make-up tank, would complete a total oil management system.

Figure 2:
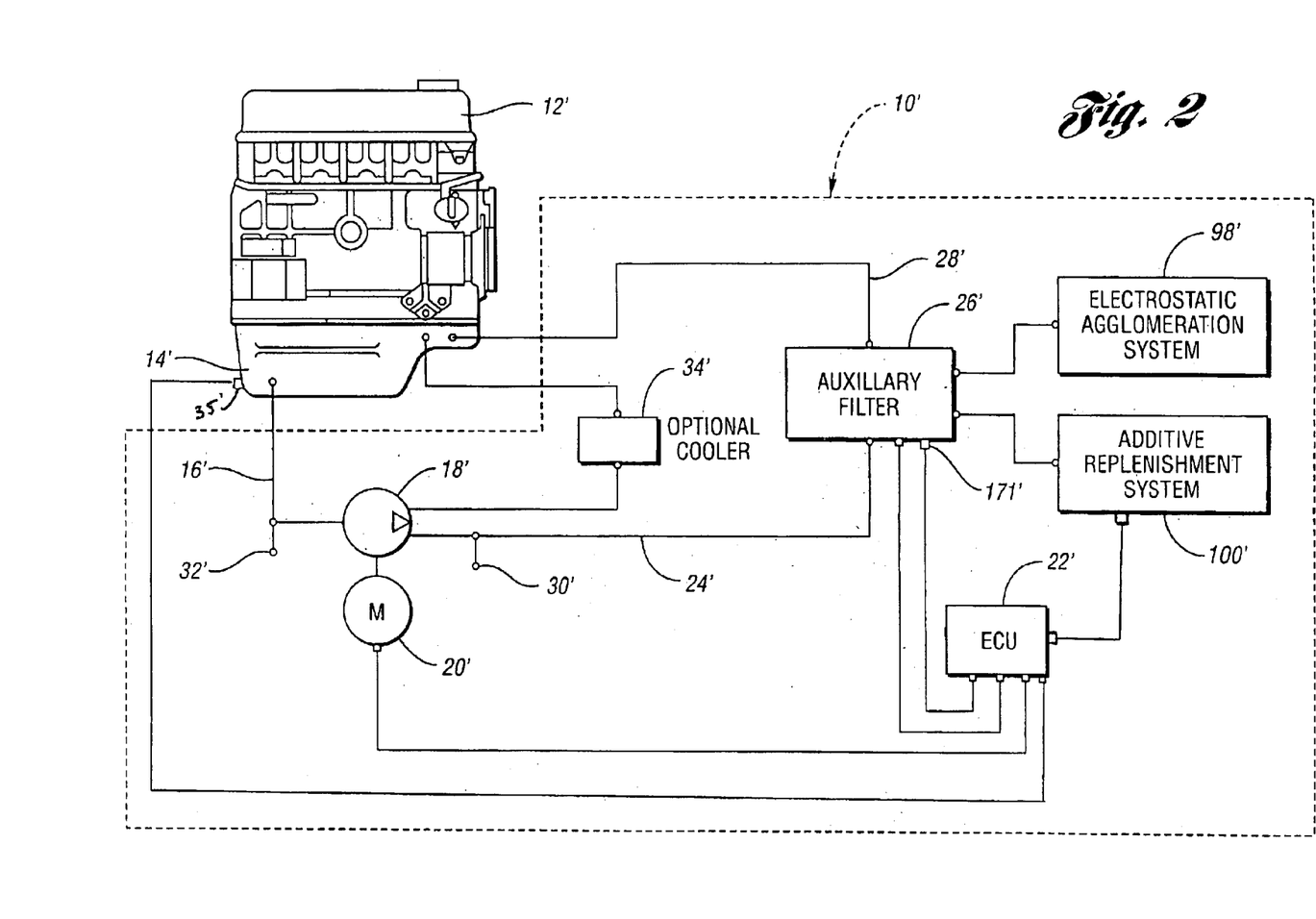
FIG. 2 shows a diagrammatic arrangement of an alternative configuration of the auxiliary filtration system and its adaptation to an engine.

FIG. 2 shows an alternative system configuration 10' of the auxiliary filtration system 10 illustrated in FIG. 1. The system 10 in FIG. 1 depicts the optional cooler 34 installed after the auxiliary filtration device 26. As shown in FIG. 2, an optional cooler 34' can also be installed on a separate loop to reduce the upstream filter pressure. Such a configuration would require the oil pump 20' to produce a dual output by means of two gerotor sets.

Figure 3:
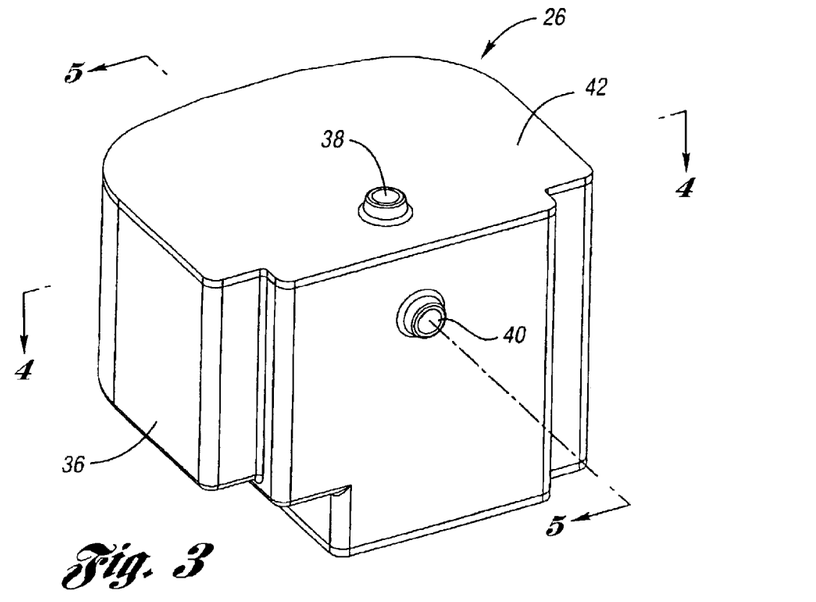
FIG. 3 shows an isometric view of the auxiliary filtration device.

FIG. 3 shows the auxiliary filtration device 26, which includes an outer housing 36 along with ports to allow fluid in and out of the device. Oil will enter the device through the inlet port 38 and exit the device through the outlet port 40. The device also consists of an access cover 42, which can be hinged, or may be a bolted flange design. To keep oil from exiting the cover-housing interface, a seal (not visible) is placed between the mating surfaces. Fluid conductors 24 and 28 (see FIG. 1) will be connected to the inlet port 38 and the outlet port 40 respectively.

Figure 4:
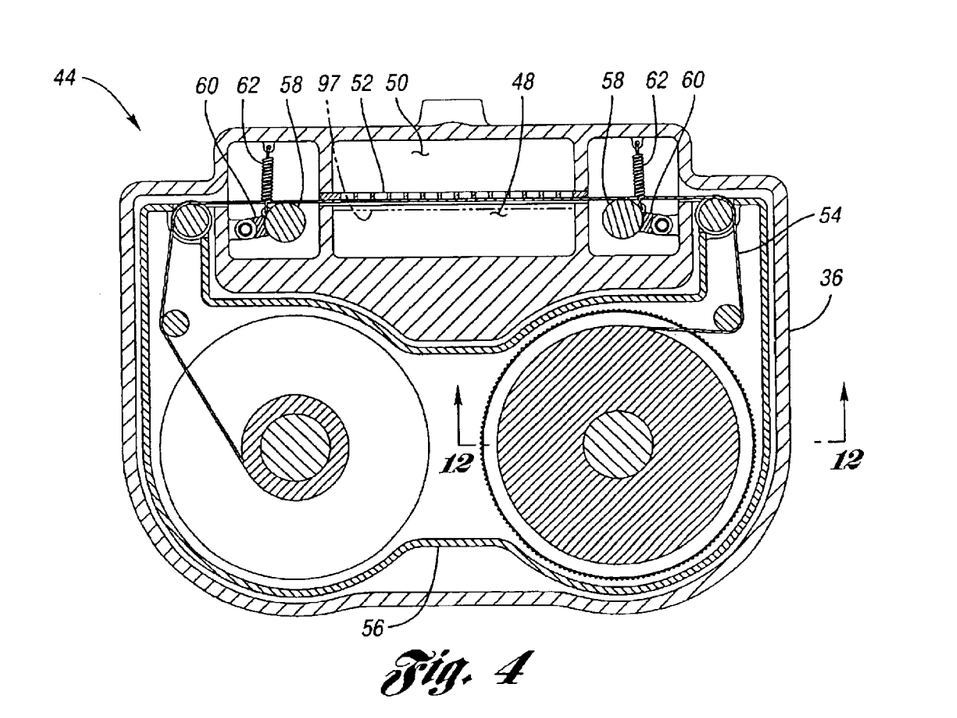
FIG. 4 shows a cross-sectional top view of the auxiliary filtration device taken through line 4—4 in FIG. 3.
Figure 5:
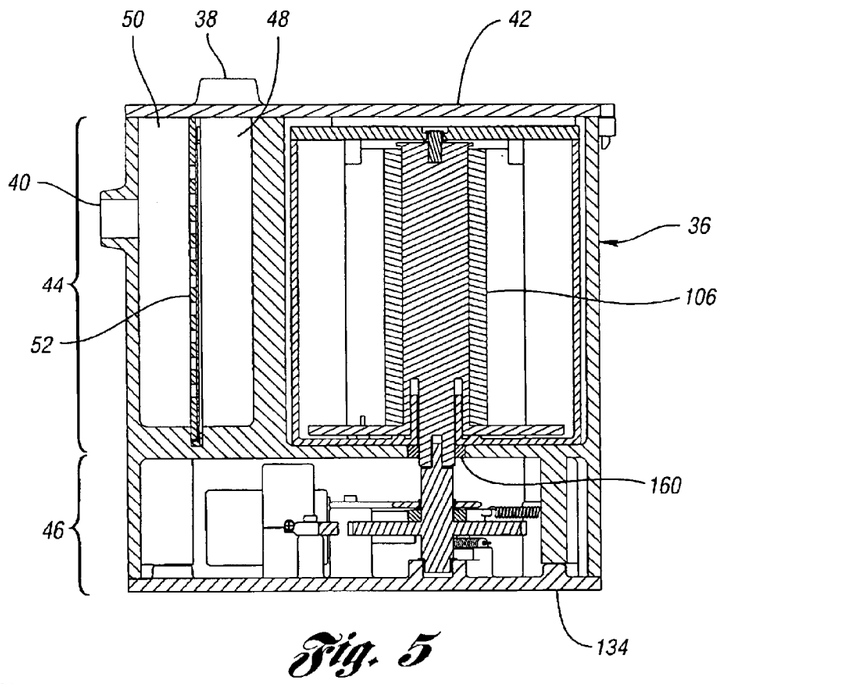
FIG. 5 shows a cross-sectional side view of the auxiliary filtration device taken through line 5—5 in FIG. 3.

As seen in FIG. 5, the auxiliary filtration device housing 36 is divided into a top compartment 44 and a bottom compartment 46. FIG. 4 shows a sectional view of the top compartment 44, taken through line 4—4 in FIG. 3. The top compartment 44 has an inlet cavity 48 for unfiltered oil flow as well as an outlet cavity 50 for filtered oil flow. A filter media support 52 separates the two cavities 48, 50 and provides support to the filtering media 54 across the flow cavities. The filter media support 52 can be a plate which is perforated to allow the fluid flow to pass through; alternatively, wire mesh can be used. The top compartment 44 also houses the filtering media cartridge 56. Finally, located in the top compartment 44, is a set of rollers 58. The rollers 58 are mounted to arms 60, which are able to pivot, and are spring loaded by attached springs 62. The rollers 58 provide a means of guiding and tensioning the filtering media 54, and also provide a means of forcing the filtering media 54 against the filter media support 52.

Figure 6:
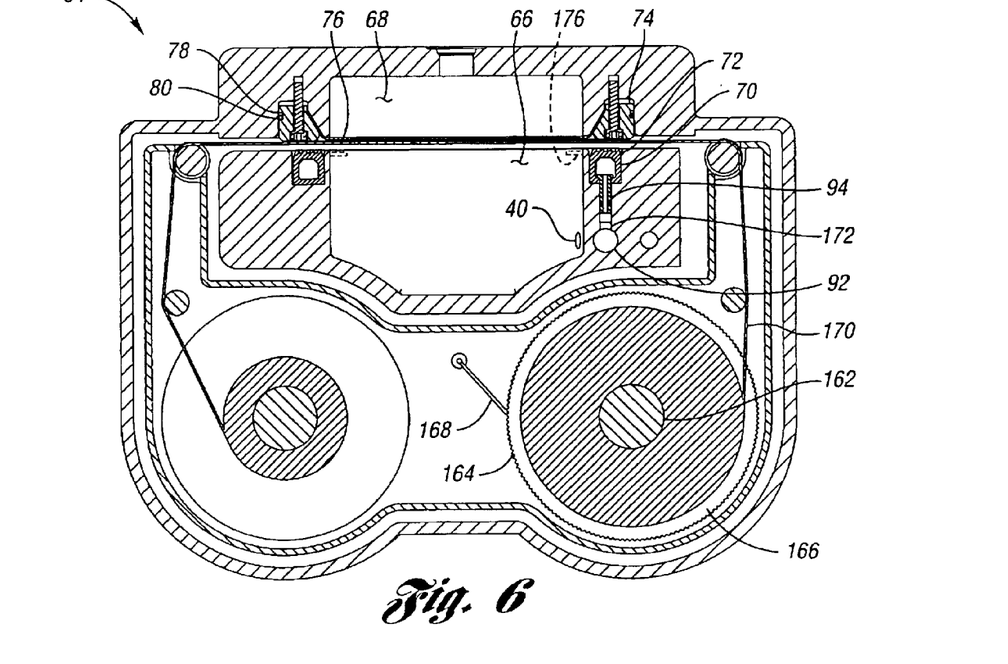
FIG. 6 shows a cross-sectional top view of an alternative embodiment of the auxiliary filtration device.
Figure 7:
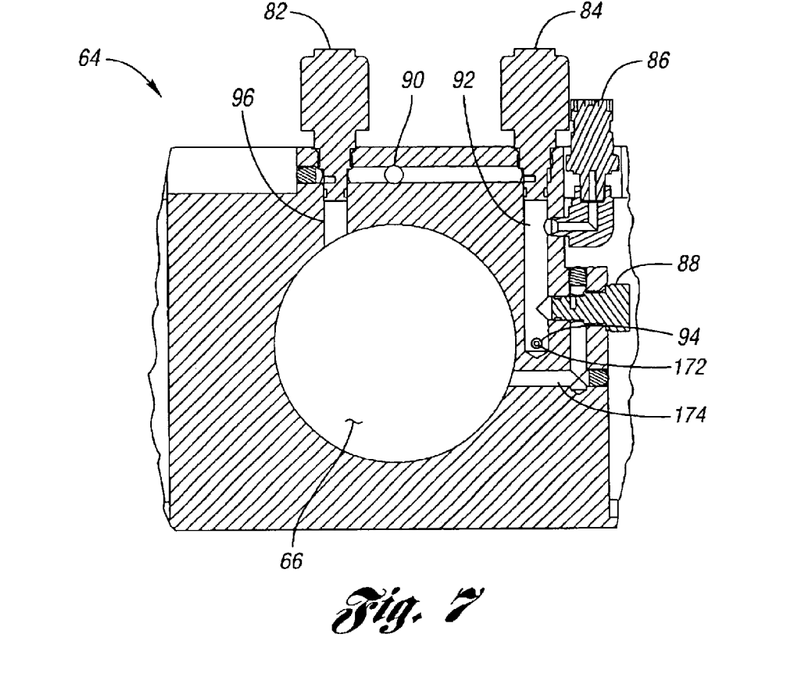
FIG. 7 shows a fragmentary cross-sectional view of the auxiliary filtration device shown in FIG. 6.

FIG. 6 shows an alternative configuration 64 of the top compartment 44 shown in FIGS. 4 and 5. Like the top compartment 44, the top compartment 64 also has an inlet cavity 66 and an outlet cavity 68. The top compartment 64 has an inflatable seal 70 between the inlet cavity 66 and the outlet cavity 68. When under fluid pressure, the inflatable seal 70 inflates axially within an annular groove 72 to seal the two cavities 66, 68. Inflation of the inflatable seal 70 forces the filtering media 54 up against a clamp ring 74. The clamp ring 74 holds a filter media support 76 in place. It also contains a male seal gland 78 for use with a sealing device such as an O-ring 80. The O-ring 80 prevents leakage around the outer circumference of the clamp ring 74. As shown in FIG. 7, the top compartment 64 includes two electronic control valves 82, 84 to control oil flow into and out of the inflatable seal 70, and into the inlet cavity 66. Also included is a pressure sensor 86 and a pressure relief device 88, both of which are common devices known to those skilled in the art. As discussed more fully below, oil flows through a main passage 90, into a passage 92, and into a stem 94 of the inflatable seal 70. This seals the inlet and outlet cavities 66, 68, and the oil is then directed through passage 96 and into the inlet cavity 66.

As shown in FIGS. 1 and 2, an electrostatic agglomeration system 98, 98' may be used to enhance the ability of the filtering media 54 (see FIG. 4) to capture small contaminants, such as soot. This could be accomplished either by placing an electrically charged wire mesh 97 (shown in phantom in FIG. 4) in front of the filtering media, or by fabricating it into the filtering media. The charged mesh would allow for the attraction and agglomeration of soot particles onto the mesh. Once the agglomerates reach a certain size, the oil flow will cause the agglomerates to break off and be collected by the filtering media. The system may also include an additive replenishment system 100 which would apply additives to the filtering media to enhance the quality of the oil. An alternative method of additive replenishment would be to apply a special chemical coating to the filtering media. Another alternative method of additive replenishment would involve mounting a replaceable and recyclable additive releasing cartridge onto the return line. The additives would dissolve into the oil flow as it passes through the cartridge.

Figure 8:
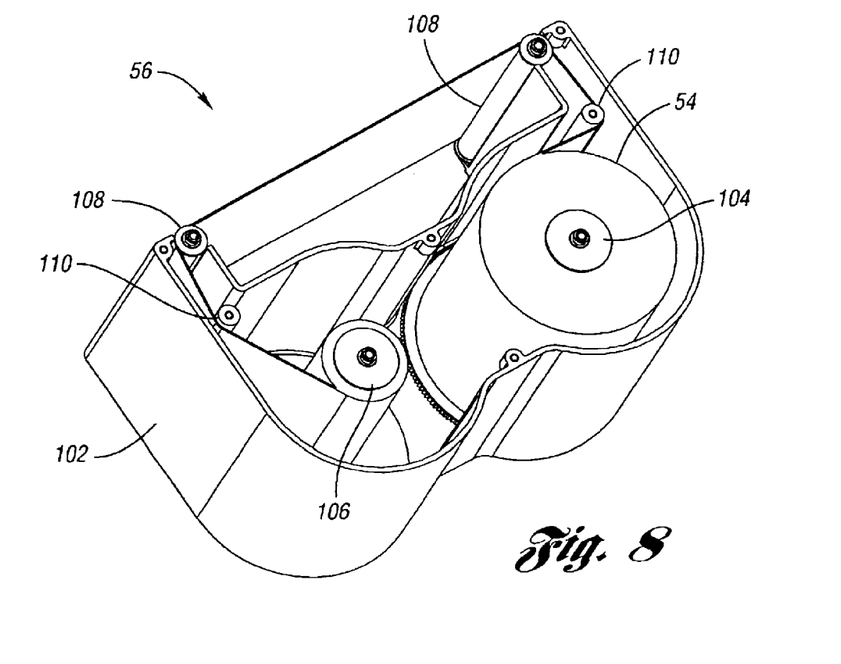
FIG. 8 shows an isometric view of the filtering media cartridge.
Figure 9:
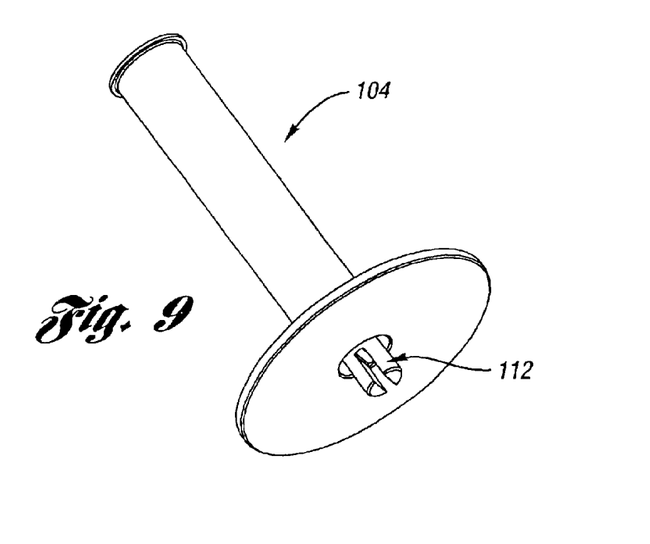
FIG. 9 shows an isometric view of the media supply reel.

FIG. 8 shows the filtering media cartridge 56 with the cover 42 removed. The filtering media cartridge 56 includes an outer housing 102, and a supply media reel 104 that holds the clean filtering media 54 in a roll-type form. The filtering media 54 is wound through the cartridge 56 onto a take-up reel 106. The cartridge 56 also houses a set of guide rollers 108 and a set of guide posts 110. The guide posts 110 direct the filtering media 54 from the supply reel 104 to the guide roller 108, and then to the take-up reel 106. Another set of guide rollers can be incorporated into the media cartridge to allow for a means of squeezing the oil out of the filtering media, as well as compacting the contaminants into the filtering media. The cartridge can be fabricated in a fashion to either be recycled or rebuilt once the filtering media 54 is completely used. FIG. 9 shows the media supply reel 104 which can be used with a tensioning device such as the one shown in FIGS. 11 and 12, which is discussed more fully below. The slotted portion 112 is only one configuration that can be used to provide a means of tensioning the media supply reel 112; others may include a cross-shaped portion, a hexagonal portion, or a drive gear. The take-up reel 106 is configured much like the supply reel 104, and can even be configured to be interchangeable with the media supply reel.

Figure 10:
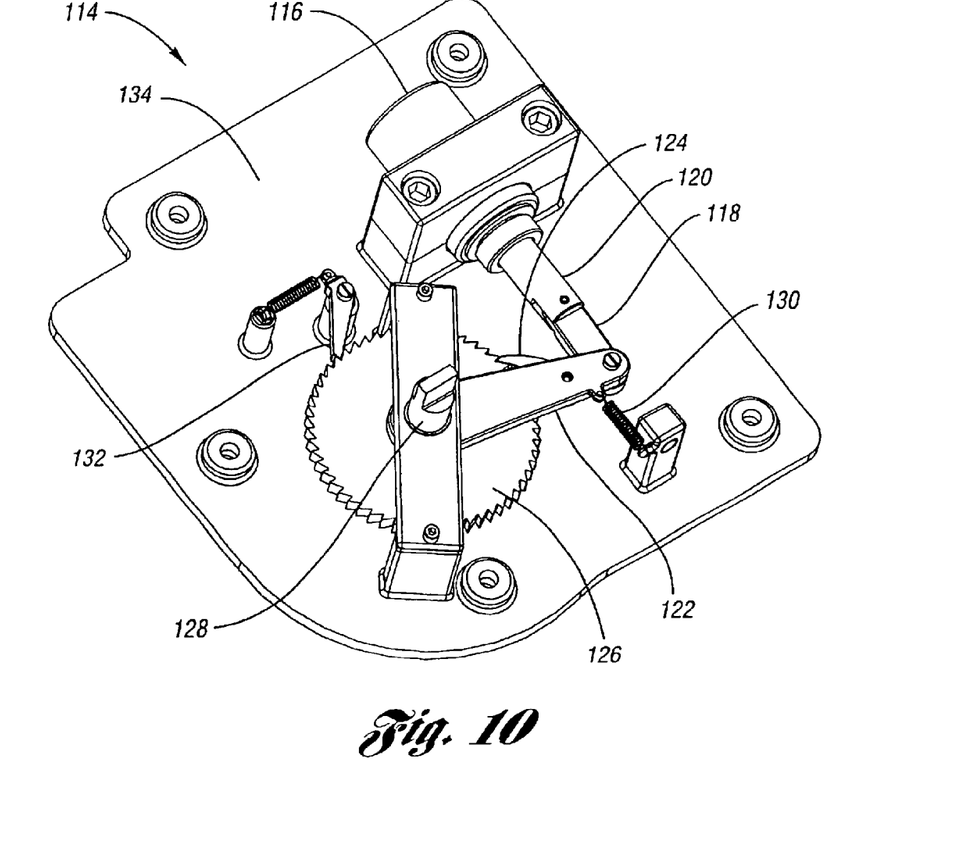
FIG. 10 shows an isometric view of the filtering media index mechanism.

FIG. 10 shows a filtering media index mechanism 114, which is positioned within the bottom compartment 46, shown in FIG. 5. This mechanism provides the means for incrementally indexing and advancing of the filtering media 54. The index mechanism 114 consists of an electric pull-type solenoid 116 as the actuator. An arm 118 links the solenoid armature 120 to a drive arm 122. Via these linkages, and a drive pawl 124, the linear motion created by the solenoid 116 is transferred into rotary motion to a ratchet wheel 126. The ratchet wheel 126 then drives an index drive shaft 128, which fits into a mating slot in the take-up reel 106 (the take-up reel 106 is configured with a slotted portion like the media supply reel 104, shown in FIG. 9).

When voltage is applied to the solenoid 116, a magnetic field is created which draws in the solenoid armature 120. This in turn, through the linkage arm 118, rotates the drive arm 122 in a counter clockwise direction (as viewed in FIG. 10). The driving pawl 124 forces the ratchet wheel 126 to rotate in this direction as well. When the solenoid 116 has completed its stroke, the armature 120 returns to its original position via a return spring 130. A spring loaded locking pawl 132 prohibits the ratchet wheel 126 from reversing its direction as the drive arm 122 is also returned to its original position.

All of the index mechanism's components are mounted to a base plate 134, which mounts up into the bottom compartment 46 of the filtration device housing 36 (see FIG. 5). An alternative method of indexing involves the replacement of the linear solenoid, linkage arm, drive arm, drive pawl, locking pawl, ratchet wheel and the springs, with an electric rotary-type solenoid. A roller clutch, which allows free rolling in one direction and drives in the other direction, is coupled to the solenoid armature shaft and the index drive shaft. When voltage is applied to the rotary solenoid, the armature shaft rotates, driving the take-up reel shaft. When the armature has reached full stroke, a built in return spring forces the armature back to its original position. The roller clutch allows for the return with out driving the take-up reel shaft back as well. Another alternative method of indexing includes the replacement of the linear solenoid, linkage arm, drive arm, drive pawl, locking pawl, ratchet wheel and springs with an electronic stepper motor. The output shaft of the stepper motor would be coupled to the take up reel shaft. In each of the indexing methods, a gear train or a pulley/belt system can be incorporated to increase the torque output to the take-up reel shaft when necessary.

Figure 11:
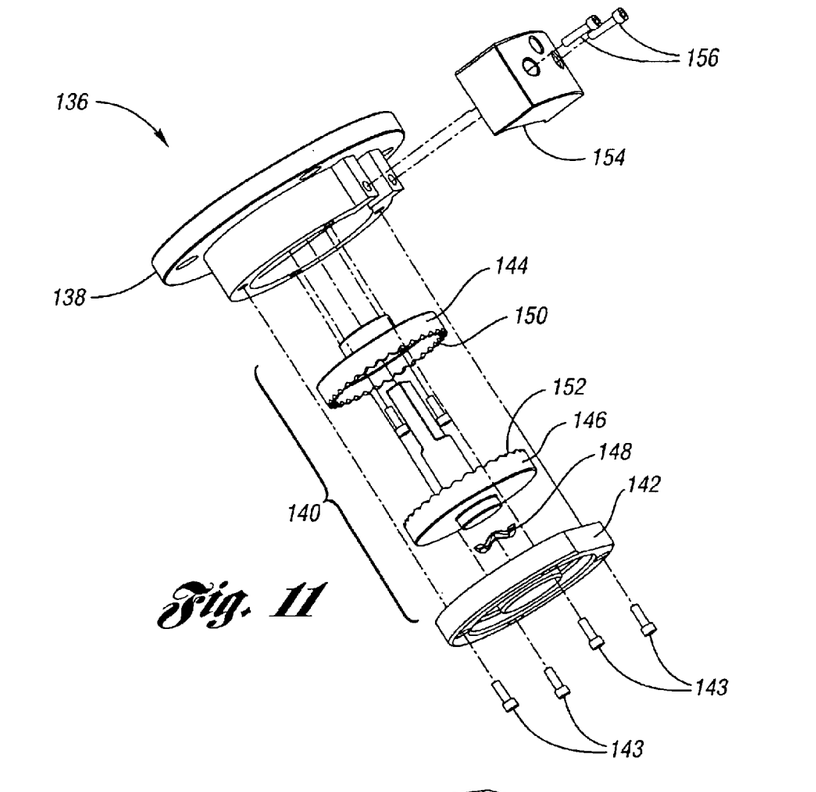
FIG. 11 shows an exploded isometric view of a tensioning device for use on the media supply reel.

FIG. 11 shows a tensioning device 136, which attaches to the supply reel 104 to eliminate slack in the filtering media 54 when it is advanced. The tensioning device 136 includes a housing 138, a ratcheting mechanism 140, and a cover 142 which is attached to the housing 138 with fasteners 143. The ratcheting mechanism 140 includes a stationary member 144 which is affixed to the housing 138, a rotating member 146 which is coupled to the media supply reel 104, and a spring 148. The spring 148 holds constant pressure between the mating gear teeth 150, 152 of the stationary member 144 and the rotating member 146. As the media supply reel 104 rotates, the spring 148 compresses, allowing the mating gear teeth 150, 152 to disengage and engage.

Figure 12:
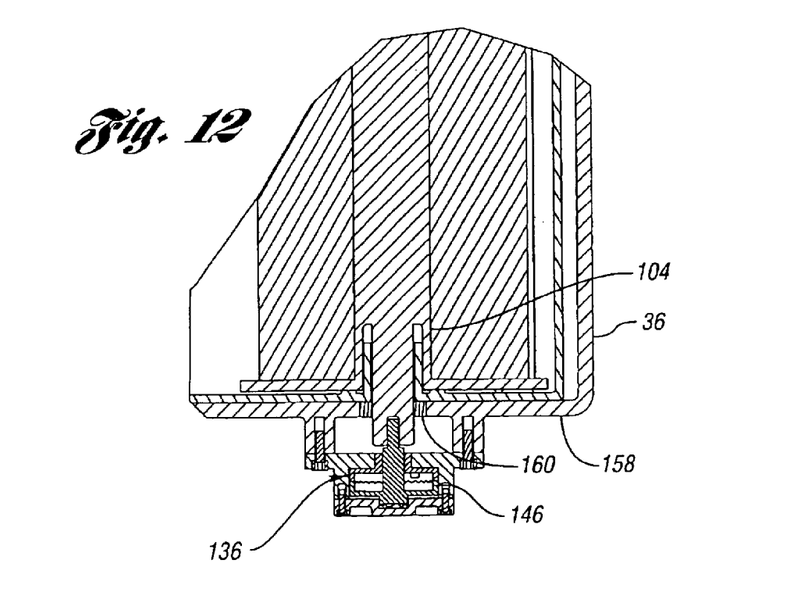
FIG. 12 shows a fragmentary cross-sectional front view of the auxiliary filtration device, taken through line 12—12 in FIG. 4.

The tensioning device 136 can also be configured to have an additional cover 154 to house a standard position sensor. The cover 154 would be attached to the housing 138 with fasteners 156. This configuration would allow for diagnostic capabilities that could indicate filter media tearing or binding, as well as other system conditions. The position sensor would detect the rotary motion of the rotating member 146. If the rotating member 146 is not rotating during an index cycle it may indicate a tear or bind in the media. FIG. 12 shows the tensioning device 136 mounted to the base of the filter device outer housing 36. The rotating member 146 is coupled to the media supply reel 104. A standard lip seal 160 is placed in the base 158 of the housing 36 to prevent oil leakage from the filtration device 26 (this same type of seal is used with the take-up reel 106, and is illustrated in FIG. 5). The sealing interface occurs between the seal 160 and the media supply reel 104.

An alternative tensioning device involves configuring the flange of the media supply reel 104 with the gear teeth. FIG. 6 shows the media supply reel 162 with teeth 164 around the circumference of its flange 166. A tab 168 is positioned to act as a spring loaded locking pawl. The tab 168 disengages and engages with the gear teeth 164 when the media supply reel 162 rotates in the counter clockwise direction. Thus, the tab 168 prevents clockwise motion of the media supply reel 162, thereby maintaining tension on the filtering media 170 as it is advanced.

Under normal operation, the electric oil pump 18 (see FIG. 1) will draw oil from the engine oil pan 14, sending the oil flow to the auxiliary filtration device 26 to be filtered. The oil flow enters the filtration device via the inlet port 38 (see FIG. 5) and then fills the inlet cavity 48. The oil flow is then passed through the filtering media 54 and is filtered, then passing through the filter media support 52 into the outlet cavity 50. The oil flow then exits through the outlet port 40 and is sent back to the engine oil pan 14. This is done in a continuous fashion. The oil pressure is monitored in both the inlet cavity 48 and the outlet cavity 50 via an electric pressure sensor 171 (shown diagrammatically in FIG. 1). As contaminants and particles build up on the exposed filtering media, a higher pressure occurs in the inlet cavity 48 versus the outlet cavity 50. When this pressure differential reaches a predetermined set-point sensed by the differential pressure sensor 171, a signal is sent to the electronic control module 22, which then stops the electric oil pump 18, thus ceasing oil flow to the auxiliary filtration device 26. Different types of pressure sensors may be used, but a differential pressure switch is particularly well suited to this application.

Next, the index mechanism 114 (see FIG. 10) is signaled to begin advancing the filtering media 54. The index drive shaft 128 drives the take-up reel 106, and causes it to wind up a dirty portion of filtering media 54. This in turn unwinds the media supply reel 104, causing clean filtering media to be advanced into the oil flow path transversely across the filter media support 52 (see FIGS. 4 and 5). After the filtering media 54 has been advanced, the electric oil pump 18 begins sending oil flow back through the auxiliary filtration device 26. This is done in an incremental fashion as the sensor monitors the differential pressure. When the differential pressure has reached a level below the set high level, indexing will cease until pressure builds up again due to the clogging of the filtering media.

As an alternative, the amount of filtering media 54 advanced can simply be based on a predetermined amount, rather than a drop in the differential pressure. For example, the filtering media can be advanced such that all of the used media is transferred to the take-up reel 106—i.e., the media is advanced one full frame. Conversely, the media may be advanced less than one full frame, such that a portion of the oil passes through clean media, while another portion of the oil passes through used media. This method takes advantage of the particles previously deposited on the filtering media (the "filter cake"), to create an even finer filter for the oil. Of course, the flow rate of oil through the filter cake is less than the flow rate through clean media; however, the benefits of additional filtering and longer media life may make this an attractive option in some applications.

The amount of filtering media 54 being advanced can be determined by a number of methods. For example, one method is to control the rotation of the ratchet wheel 126, which is directly related to the amount of filtering media 54 being advanced. Similar methods can be used when the indexing system is configured with a rotary solenoid or a stepper motor. When an extended preventive maintenance interval for the engine has been reached, the filtration device access cover 42 is removed, and the filtering media 54, the media supply reel 104, and the take-up reel 106 are replaced. If the auxiliary oil filter is configured with a filtering media cartridge, such as 56 in FIG. 4, the entire cartridge is replaced. The length of the extended preventative maintenance interval can be based on a set time period, or by monitoring the total amount of filtering media used. Installing larger spools of filtering media and reducing the amount of filtering media advanced in each index cycle may increase this interval. Then, after installing clean filtering media, the auxiliary filtration device 26 is ready for another filtering cycle.

The operation of the auxiliary filtration device 26 is altered when configured with the inflatable seal 70 (see FIGS. 6 and 7). When oil initially enters the main passage 90, the valve 82 is closed and the valve 84 is opened. This allows the oil flow to enter passage 92, which in turn feeds the inflatable seal 70 via passage 172 and the inflatable seal stem 94. The oil pressure causes the seal 70 to inflate axially, forcing the filtering media 170 up against the media support 76 and the clamp ring 74. When the pressure sensor 86 senses that a predetermined seal pressure has been attained, the valve 82 opens, the valve 84 closes, and the oil flow is directed to passage 96. Passage 96 feeds the inlet cavity 66, thus allowing the filtration process to begin.

The inflatable seal 70 maintains a positive seal between the inlet and outlet cavities 66, 68 by trapping oil in the seal when valve 84 is closed. The seal pressure is monitored via the use of the pressure sensor 86, and if the seal pressure exceeds the predetermined pressure, the pressure relief device 88 opens to allow oil to enter passage 174 and bleed into the inlet cavity 66. As with other embodiments, once the predetermined pressure differential across the filtering media 170 is attained, the electronic oil pump ceases directing oil flow to the filtration device. The passage 92 is opened, thereby releasing the pressure and deflating the inflatable seal 70. The filtering media 170 is then advanced, and the process begins again with the inflation of the inflatable seal 70. Another alternative seal design involves the use of a flexible lip seal 176 (shown in phantom in FIG. 6) which projects inwardly from the periphery of the inlet cavity 66. The pressure differential across the filtering media 170 causes the lip seal 176 to engage the filtering media 170, thereby sealing the engine oil substantially within the inlet and outlet cavities 66, 68.

The present invention is a significant improvement over the current technology in lubrication system filtration for engine applications. Some of the major improvements include: (1) the use of an auxiliary filtration system, the operation of which is totally independent of the engine lubrication system, (2) a filtering method which applies continuous, finer filtration with unlimited filtering capacity, (3) the addition of a remote fill and drain to aid in servicing, (4) the opportunity to integrate problematic contaminant collection techniques as well as additive replenishment schemes and (5) the opportunity to integrate an oil level and quality sensor, an oil make-up scheme, and an oil cooler to complete a total oil management system.

The present invention also contemplates the use of such a filter having a removable media cartridge as a replacement of the conventional full flow filter. It is also contemplated that the invention could be used as a by-pass filter in parallel with the conventional filter, rather than being used with an independent pump. It is further contemplated that the replaceable aspect of the media cartridge could be eliminated and the filtering media reels would simply be stored in the filter housing permanently.

While the best modes for carrying out the invention have been described in detail, those familiar with the art to which this invention relates will recognize various alternative designs and embodiments for practicing the invention within the scope of the appended claims.

What is claimed is:

1. An auxiliary oil filter for a vehicle having an engine lubrication system, the auxiliary oil filter comprising:
   a housing having an inlet port for receiving engine oil separately from the engine lubrication system, and an outlet port for returning filtered oil to the engine, the housing defining an inlet cavity in fluid communication with the inlet port, and an outlet cavity in fluid communication with the outlet port;
   a seal disposed within the housing for sealing engine oil substantially within the inlet and outlet cavities;
   a media supply reel disposed within the housing and having a roll of filtering media thereon;
   a take-up reel disposed within the housing and configured to receive the filtering media from the supply reel; and
   a media indexing system operative to rotate the take-up reel to receive used filtering media.

2. The auxiliary oil filter of claim 1, wherein the seal is a lip seal disposed at least partially within the inlet cavity and configured to engage the filtering media.

3. The auxiliary oil filter of claim 1, wherein the seal is an inflatable seal, configured to be inflated by engine oil.

4. The auxiliary oil filter of claim 1, further comprising a processor for at least controlling the media indexing system and the flow of engine oil into the auxiliary oil filter.

5. The auxiliary oil filter of claim 4, further comprising a pressure sensor for monitoring the oil pressure in the inlet cavity and the outlet cavity, and for signaling the processor.

6. An oil filtration system for an engine, comprising:
   an auxiliary oil filter for receiving and filtering oil from the engine, the auxiliary oil filter including,
   a) a housing having an inlet port for receiving engine oil, and an outlet port for returning filtered oil to the engine,
   b) a media supply reel disposed within the housing and having a roll of filtering media thereon,
   c) a take-up reel disposed within the housing and configured to receive the filtering media from the supply reel, and
   d) a media indexing system disposed within the housing and operative to rotate the take-up reel to receive used filtering media.

7. The oil filtration system of claim 6, wherein the auxiliary oil filter further includes a removable media cartridge disposed within the housing and containing at least the media supply reel and the take-up reel.

8. The oil filtration system of claim 6, wherein the auxiliary oil filter further includes a tensioning apparatus disposed within the housing, and operatively connected to the media supply reel for maintaining tension on the filtering media.

9. The oil filtration system of claim 6, wherein the auxiliary oil filter further includes a filter media support disposed within the housing for supporting the filtering media as engine oil is filtered.

10. The oil filtration system of claim 6, further comprising an electrostatic agglomeration system operatively associated with the filtering media to enhance the collection of small contaminants on the filtering media.

11. The oil filtration system of claim 6, further comprising an additive replenishment system operatively associated with the auxiliary oil filter to release additives into the oil.

12. The oil filtration system of claim 6, further comprising a sensor for sensing the quality and the level of the oil in the engine.

13. The oil filtration system of claim 6, further comprising an oil cooler operatively connected between the auxiliary oil filter and the engine.

14. The oil filtration system of claim 6, further comprising an auxiliary pump operatively connected between the engine and the auxiliary oil filter for pumping oil from the engine to the auxiliary oil filter.

15. The oil filtration system of claim 14, further comprising an oil cooler operatively connected between the pump and the engine.

16. The oil filtration system of claim 14, further comprising a subsystem for remote filling and draining for oil replacement.

17. The oil filtration system of claim 16, wherein the subsystem includes a first directional control valve operatively connected between the engine and the pump for remote oil filling and a second directional control valve operatively connected between the pump and the auxiliary filter for oil draining.

18. An oil filtration system for an engine, comprising:

an auxiliary oil filter for receiving and filtering oil from the engine, the auxiliary oil filter including, a) a housing having an inlet port for receiving engine oil, and an outlet port for returning filtered oil to the engine, b) a media supply reel disposed within the housing and having a roll of filtering media thereon, c) a take-up reel disposed within the housing and configured to receive the filtering media from the supply reel, and d) a media indexing system operative to rotate the take-up reel to receive used filtering media; and a processor for at least controlling the media indexing system and the flow of engine oil into the auxiliary oil filter.

19. The oil filtration system of claim 18, further comprising an electrostatic agglomeration system operatively associated with the filtering media to enhance the collection of small contaminants on the filtering media.

20. The oil filtration system of claim 18, further comprising an additive replenishment system operatively associated with the auxiliary oil filter to release additives into the oil.

21. The oil filtration system of claim 18, further comprising a sensor for sensing the quality and the level of the oil in the engine.

22. The oil filtration system of claim 18, further comprising an oil cooler operatively connected between the auxiliary oil filter and the engine.

23. The oil filtration system of claim 18, further comprising an auxiliary pump operatively connected between the engine and the auxiliary oil filter for pumping oil from the engine to the auxiliary oil filter.

24. The oil filtration system of claim 23, further comprising an oil cooler operatively connected between the pump and the engine.

25. The oil filtration system of claim 23, further comprising a subsystem for remote filling and draining for oil replacement.

26. The oil filtration system of claim 25, wherein the subsystem includes a first directional control valve operatively connected between the engine and the pump for remote oil filling and a second directional control valve operatively connected between the pump and the auxiliary filter for oil draining.

* * * * *